United States Patent
Azevedo et al.

(10) Patent No.: US 7,035,979 B2
(45) Date of Patent: Apr. 25, 2006

(54) METHOD AND APPARATUS FOR OPTIMIZING CACHE HIT RATIO IN NON L1 CACHES

(75) Inventors: Michael Joseph Azevedo, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 10/154,380

(22) Filed: May 22, 2002

(65) Prior Publication Data

US 2003/0221072 A1  Nov. 27, 2003

(51) Int. Cl.
*G06F 12/00* (2006.01)
(52) U.S. Cl. ..................... 711/137; 711/144
(58) Field of Classification Search ............. 711/137, 711/213
See application file for complete search history.

(56) References Cited

U.S. PATENT DOCUMENTS

| | | | |
|---|---|---|---|
| 5,093,777 A * | 3/1992 | Ryan | 711/3 |
| 5,367,656 A * | 11/1994 | Ryan | 711/213 |
| 5,623,608 A * | 4/1997 | Ng | 711/137 |
| 5,694,572 A * | 12/1997 | Ryan | 711/118 |
| 5,781,922 A | 7/1998 | Braceras et al. | |
| 5,787,469 A | 7/1998 | Merrell | |
| 5,805,855 A | 9/1998 | Liu | |
| 5,815,700 A | 9/1998 | Poplingher et al. | |
| 5,826,052 A | 10/1998 | Stiles et al. | |
| 5,829,027 A | 10/1998 | Goodrum | |
| 5,835,946 A | 11/1998 | Allen et al. | |
| 5,875,462 A | 2/1999 | Bauman et al. | |
| 5,875,470 A | 2/1999 | Dreibelbis et al. | |
| 5,893,163 A | 4/1999 | Arimilli et al. | |

(Continued)

FOREIGN PATENT DOCUMENTS

EP  0 404 126  6/1990

(Continued)

OTHER PUBLICATIONS

Preemptible Cache Line Prefetch Algorithm And Implementation, IBM Technical Disclosure Bulletin, vol. 33, Issue 3B, pp. 371 373. Aug. 1, 1990.*

(Continued)

*Primary Examiner*—Kevin Verbrugge
(74) *Attorney, Agent, or Firm*—Chambliss, Bahner & Stophel, P.C.; David W. Lynch

(57) ABSTRACT

A method and apparatus for increasing the performance of a computing system and increasing the hit ratio in at least one non-L1 cache. A caching assistant and a processor are embedded in a processing system. The caching assistant analyzes system activity, monitors and coordinates data requests from the processor, processors and other data accessing devices, and monitors and analyzes data accesses throughout the cache hierarchy. The caching assistant is provided with a dedicated cache for storing fetched and prefetched data. The caching assistant improves the performance of the computing system by anticipating which data is likely to be requested for processing next, accessing and storing that data in an appropriate non-L1 cache prior to the data being requested by processors or data accessing devices. A method for increasing the processor performance includes analyzing system activity and optimizing a hit ratio in at least one non-L1 cache. The caching assistant performs processor data requests by accessing caches and monitoring the data requests to determine knowledge of the program code currently being processed and to determine if patterns of data accession exist. Based upon the knowledge gained through monitoring data accession, the caching assistant anticipates future data requests.

22 Claims, 12 Drawing Sheets

U.S. PATENT DOCUMENTS

| | | |
|---|---|---|
| 5,903,908 A | 5/1999 | Singh et al. |
| 5,909,694 A | 6/1999 | Gregor et al. |
| 5,918,246 A | 6/1999 | Goodnow et al. |
| 5,956,477 A | 9/1999 | Ranson et al. |
| 6,038,642 A | 3/2000 | Arimilli et al. |
| 6,044,437 A | 3/2000 | Reinders |
| 6,047,363 A * | 4/2000 | Lewchuk .................. 711/213 |
| 6,081,872 A | 6/2000 | Matick et al. |
| 6,092,186 A | 7/2000 | Betker et al. |
| 6,098,154 A * | 8/2000 | Lopez-Aguado et al. ... 711/137 |
| 6,101,578 A | 8/2000 | Patwardhan et al. |
| 6,105,111 A | 8/2000 | Hammarlund et al. |
| 6,115,795 A | 9/2000 | Gilda et al. |
| 6,119,222 A | 9/2000 | Shiell et al. |
| 6,138,213 A * | 10/2000 | McMinn .................... 711/137 |
| 6,157,986 A | 12/2000 | Witt |
| 6,157,993 A * | 12/2000 | Lewchuk .................. 711/213 |
| 6,161,166 A | 12/2000 | Doing et al. |
| 6,175,906 B1 | 1/2001 | Christie |
| 6,192,451 B1 | 2/2001 | Arimilli et al. |
| 6,202,125 B1 | 3/2001 | Patterson et al. |
| 6,202,129 B1 | 3/2001 | Palanca et al. |
| 6,212,629 B1 | 4/2001 | McFarland et al. |
| 6,219,760 B1 * | 4/2001 | McMinn .................... 711/137 |
| 6,446,167 B1 | 9/2002 | Mayfield et al. |
| 6,601,143 B1 * | 7/2003 | Lamparter .................. 711/134 |
| 2003/0084433 A1 * | 5/2003 | Luk et al. ................... 717/158 |

FOREIGN PATENT DOCUMENTS

| | | |
|---|---|---|
| EP | 560100 A * | 9/1993 |
| JP | 05334082 | 6/1992 |
| JP | 05088960 | 4/1993 |
| JP | 08016390 | 1/1996 |
| JP | 08036525 | 2/1996 |
| JP | 11003280 | 1/1999 |
| JP | 11259300 A | 9/1999 |
| JP | 11272559 | 10/1999 |
| JP | 11316750 | 11/1999 |
| KR | 1999-0070179 | 9/1999 |

OTHER PUBLICATIONS

NN8901462, Biasing Cache Threshold Pointers Toward Less Pre-Staging, IBM Technical Disclosure Bulletin, Jan. 1989, vol. 31, Issue No. 8, pp. 462-466.*

"Controlling of Microprocessor's Internal And External Cache Memory," IBM Technical Disclosure Bulletin, No. 8B, Jan. 1990, 3 pages, http://www.delphion.com/tdbs/tdb?&order=90A+60276.

* cited by examiner

| Access Type | CPU Cycles | Time (ns) |
|---|---|---|
| L1 Access | 1 | 2 |
| L2 Access | 5 | 10 |
| Main Memory Access | ~75 | 150 |

METHOD AND APPARATUS FOR OPTIMIZING CACHE HIT RATIO IN NON L1 CACHES

CROSS-REFERENCE TO RELATED APPLICATION

This application is related to the following co-pending and commonly-assigned U.S. Patent Application, which is hereby incorporated herein by reference in their respective entirety:

"METHOD AND APPARATUS PROVIDING NON LEVEL ONE INFORMATION CACHING USING PREFETCH TO INCREASE A HIT RATIO" to Azevedo et al., having U.S. patent application Ser. No. 10/153,966 filed on May 22, 2002.

BACKGROUND OF THE INVENTION

1. Field of the Invention

This invention relates in general to processor caching methods, and more particularly to a method and apparatus for increasing processor performance in a computing system by optimizing the hit ratio of data requests from data requesting devices by providing the data requesting devices with a caching assistant embedded thereon.

2. Description of Related Art

There has been a dramatic increase in the amount and type of data that computing systems are processing of late. Computing systems routinely process two dimensional and three dimensional images, graphics, audio and video media. Networking has allowed information to be shared throughout the world. The consumer demands seamless access to data and a high level of performance of media containing vast quantities of data. Computing systems are being required to perform more demanding tasks to satiate consumer's media hunger.

In order to increase performance, processors may be provided with embedded caches to store data logically and physically closer to the processor. An embedded cache operates at the processor frequency and therefore allows access to data more quickly than external caches.

Many computing systems like storage controllers, routers and servers use processors to control various hardware components. The processors run real time operating systems, handle interrupts, set up direct memory access transfers, check control information for validity, translate addresses and perform other functions. Because these functions are in the critical functional path, the overall performance of these routines is greatly influenced by processor performance.

Numerous major factors contribute to processor performance. One such factor is the core operating frequency of the processor. Another factor is the amount and type of level 1 (L1) data and instruction caches resident on the processor. Caches are classified by the level they occupy in the memory hierarchy. Early computers employed a single, multichip cache that occupied one level of the hierarchy between the processor and the main memory. Two developments made it desirable to introduce two or more cache levels in a high performance system: the feasibility of including part of the real memory space on a microprocessor chip and growth in the size of main memory in computers. A level one (L1) or primary cache is an efficient way to implement an on-chip memory.

An additional factor is the amount and type of level 2 (L2) caches present, if any. An additional memory level can be introduced via either on-chip or off-chip level two (L2) secondary cache. The desirability of an L2 cache increases with the size of main memory. As main memory size increases further, even more cache levels may be desirable. The L1 cache is higher in the cache hierarchy than the L2 cache. The L1 cache contains less data than the L2 cache and all the data and information that is stored on the L1 cache is also stored on the L2 cache.

The type and stages of the data transfer pipeline within the processor is another important factor affecting processor performance. Another important factor contributing to processor performance is the number of instructions which can be executed simultaneously by the processor.

Effective cache subsystems will desirably provide instruction and data availability with minimum latency. A processor or another data requesting device requests a specific access (piece of information or data). If the access is immediately available in the cache, the request is considered a hit. However, if the access is not already present and available in the cache, this is considered a miss.

By way of definition, a hit ratio is a measure of the probability that an access will be resident in a particular cache. High hit ratios result in lower processing times for similar units of work. That is, if L1 caches run at processor speeds and have the capacity to contain the entire code load, including all necessary peripheral data and instructions, then the resulting processing time would be the smallest time possible. The processor would then be operating at maximum or peak performance.

However, the reality is that modern code loads for complex programs and systems are very large, often many megabytes. Therefore, it is impractical to provide processors with embedded L1 caches having such large capacities. For example, practical constraints have limited L1 caches in processors to 32K bytes or less in most cases. A split L1 cache contains both a data cache and a instruction cache. Sizes of each cache vary considerably, but are commonly 32K each or less. Instruction hit ratios, using economically feasible L1 capacities currently available, have tended to be disappointingly low. To overcome this disadvantage, processors having embedded L2 caches, in addition to the smaller capacity embedded L1 caches disposed therein and which run at processor speed, are desirable.

Processors having embedded L2 caches running at processor speeds provide significant increases in performance while meeting requirements for cost, power and space. Bearing the power, cost and space requirements in mind, an L2 cache having 256K to 512K bytes of memory can be placed on a processor. Unfortunately, many L2 subsystems are only 2 way set associative. This means that for a given tag there are only 2 addresses stored in the cache for that tag. In a complex program or system having lots of branches and/or lots of subroutine calls, this sort of cache can detract significantly from the hit ratio.

Therefore, due to size limitations and the type of L2 cache, the misses may still represent a sizable portion of the fetches done by the processor. A miss will result in fetching from the next level of memory in the memory hierarchy. This can mean significantly more CPU cycles, e.g., as many as 75 CPU cycles or more, to fetch a cache line. Of course, the cycle time is longer for data accesses from main memory than for data access from embedded caches.

Further complicating the main memory access times is the desire for these systems to have a shared memory between the processor and data moving components (input/output devices). When designing complex systems there are also competing design constraints. The systems are required to be accepted into standard slots provided in computer hardware. In such environments, there are power and cost considerations which often prevent the use of the fastest processors available in servers or desktop PCs.

For these environments where space, cost and power are limitations, the system designers are faced with very limited options regarding how to minimize main memory accesses while meeting the power dissipation and cost budgets and also meeting physical space constraints.

It is desirable to design additional caches residing external to the processor which can be used to reduce data access times and make data requests to the main memory as few as possible. There are also specialized caches used by virtual memory systems to keep virtual page translation tables which are accessed frequently in memory with short access times.

Traditional caching and cast out algorithms involve some sort of algorithm, e.g., Least Recently Used (LRU), in order to determine which cache line to invalidate or cast out in favor of a newly accessed item. Unfortunately, such algorithms do not have access to information such as: how often a certain cache line is fetched, does a particular address seem to get cast out frequently, what addresses are likely to get accessed once a given address has been fetched. Such information is very difficult to manage and make decisions upon given traditional caching hardware.

Controlling a processor's internal and external cache memory has been attempted via use of a cache controller being situated logically and physically external to the data requesting device or processor. However, an external cache controller is severely disadvantaged in performing the function of controlling the internal and external cache memory of a processor. Because the cache controller is located external to the processor and at some distance from the processor, the cache controller is unable to operate at processor speeds. The processor performs data requests faster than the external cache controller is able to comply with. The result is that the CPU may encounter stalls in its pipeline as latency increases.

It can be seen that there is a need for a method and apparatus for increasing the processor performance of a computing system.

SUMMARY OF THE INVENTION

To overcome the limitations in the prior art described above, and to overcome other limitations that will become apparent upon reading and understanding the present specification, the present invention discloses a method and apparatus for increasing processor performance in a computing system.

The present invention solves the above-described problems by providing a caching assistant to go along with the cache controller which provides cache analysis and cache maintenance. The method and apparatus is applicable to processors having embedded L2 caches, embedded L3 caches, external L2 caches, external L3 caches, etc., and other special purpose caches. It is also applicable to processors having embedded L1 caches to optimize the hit ratio of at least one non-L1 cache.

A method in accordance with the principles of the present invention includes analyzing system activity and optimizing a hit ratio of at least one non-L1 cache.

In another embodiment of the present invention, a computing system includes at least one processor, a memory that includes a cache hierarchy, and a caching assistant, wherein the caching assistant includes a cache controller for analyzing system activity and a memory, wherein the caching assistant increases processor performance by optimizing the hit ratio of at least one non-L1 cache.

In another embodiment of the present invention, a caching assistant includes a cache controller for analyzing system activity and a cache dedicated to the caching assistant, wherein the caching assistant increases processor performance by optimizing the hit ratio of at least one non-L1 cache.

In another embodiment of the present invention, a processing system includes means for analyzing system activity and means for optimizing a hit ratio of at least one non-L1 cache.

In another embodiment of the present invention, an article of manufacture includes a program storage medium readable by a computer, the medium tangibly embodying one or more programs of instructions executable by the computer to perform a method for increasing processor performance in a computing system, the method including analyzing system activity and optimizing a hit ratio of at least one non-L1 cache.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for optimizing the hit ratio of at least one non-L1 cache operatively connected to a processor by providing a caching assistant to go along with the cache controller which provides cache analysis and cache maintenance. The method and apparatus is applicable to processors having embedded L2 caches, embedded L3 caches, external L2 caches, external L3 caches, etc., and other special purpose caches. It is also applicable to processors having embedded L1 caches to optimize a hit ratio of at least one non-L1 cache. Caching assistant firmware may be downloaded into memory to implement optimization methods, to reset the hard processor core and to implement downloaded caching assistant firmware. The caching assistant is extremely flexible. The caching assistant is programmable and thus is able to adapt to different workloads quickly and easily.

Figures 1, 2:
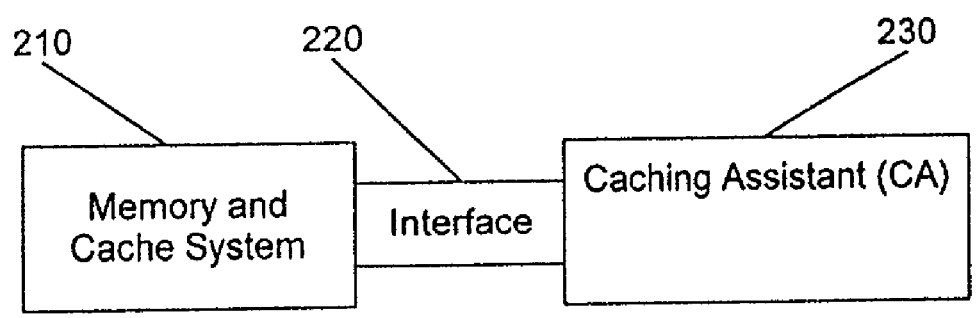
FIG. 1 illustrates a table showing relative access times for a computing system.
FIG. 2 illustrates the relationship of a caching assistant to a caching system through an interface according to an embodiment of the invention.

FIG. 1 illustrates a table 100 of typical memory access times. However, memory access times may vary according to system characteristics including the processor operating frequency. In FIG. 1, relative access times 130 for a 500 MHz processor having embedded L1 and L2 caches and a main memory with a 32 byte cache line and 64 bit L2 access width in accordance with an embodiment of the invention, are shown. Table 100 shows relative access times 130 and the number of cycles needed to perform an access 120 for a 500 MHz processor with various access types 110. In column 110 the access types are disclosed.

Embedded L1 cache access 140 is shown accessing data in one (1) cycle in column 120 and taking 2 nanoseconds (ns), as shown in column 130. Similarly, embedded L2 cache access 150 is shown accessing data in 5 CPU cycles and taking 10 ns. Main memory access 160 is shown accessing data in approximately 75 CPU cycles and taking 150 ns. Clearly, it is desirable to avoid main memory access, if possible. Numerous factors may influence table 100 and therefore the numbers may be different in various applications.

However, the magnitude of the difference between a cache access (140 or 150) and a main memory access 160 will be similar. As CPU cycle time decreases, the difference between memory cycle time and processor cycle time increases. It should be noted that a memory access may be a read function, a write function or another function. In order to optimize program execution speed, accesses to main memory are minimized. The values illustrated in FIG. 1 are given for purposes of demonstration and the present invention is not limited to the values shown in the table 100.

Because of the magnitude of difference between a cache access time and a main memory access time is great, accesses to main memory should be minimized. Preferentially, data and instruction accesses should be available in an embedded cache, whenever possible. Further, an external L3 cache may be added to increase the overall performance.

FIG. 2 is a block diagram of a caching system 200. FIG. 2 shows the relationship between the caching assistant 230 and a memory and cache system 210 through an interface 220. The caching assistant 230 works in conjunction with the memory and cache system 210 to provide a data requesting device with the most relevant data accesses. Increasing the likelihood that an access will be found in a particular cache improves the hit ratio and increases overall processor performance. The interface 220 between the memory and cache system 210 and caching assistant 230 allows the caching assistant 230 to de-stage updated information to the main memory. There are registers in the memory and cache system 210 that the caching assistant 230 can set which disallow write caching to certain address ranges.

Figure 3:
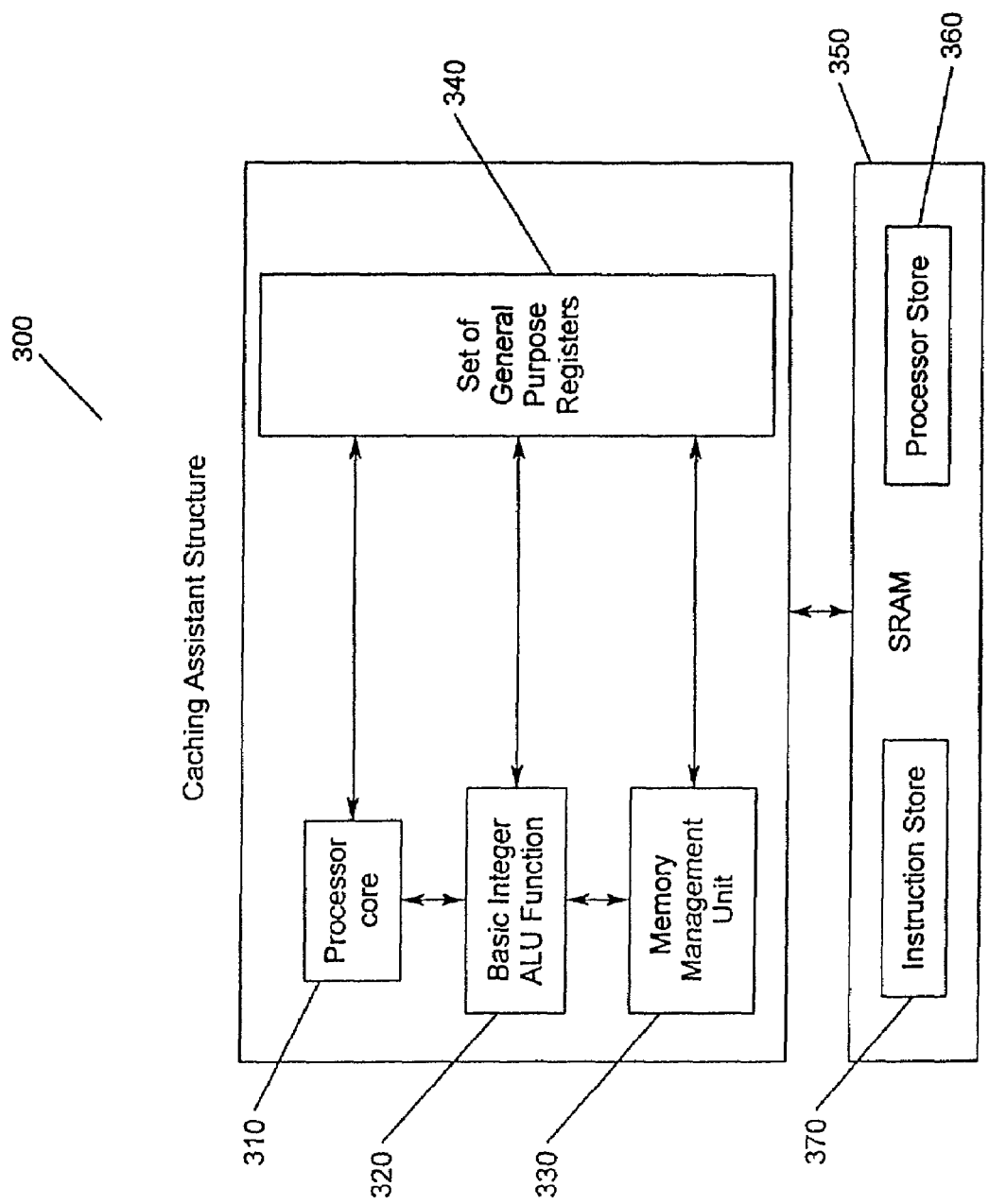
FIG. 3 illustrates a caching assistant structure, associated elements and the relationship between the caching assistant and a memory in an embodiment according to the invention.

FIG. 3 illustrates a caching assistant structure 300. In FIG. 3, the caching assistant includes a fast processor core 310. The processor core 310 operates in conjunction with a basic integer ALU function register 320, a set of general purpose registers 340, and a memory management unit 330. No translation is required because simple real addressing is sufficient The caching assistant structure 300 is shown having a memory 350, e.g., a dedicated cache 350. The memory 350 may be, for example, an associated SRAM. The memory 350 is dedicated to use by the caching assistant 300. The memory 350 is shown to include an instruction store 370 and a processor store 360. It is important not to confuse the memory 350, including processor store 360 and instruction store 370, with the large cache memory, i.e. the cache hierarchy, (680, 780 and 880, shown in FIGS. 6–8), which the caching assistant 300 is controlling and which will be described in more detail in FIGS. 6–8.

Figure 4:
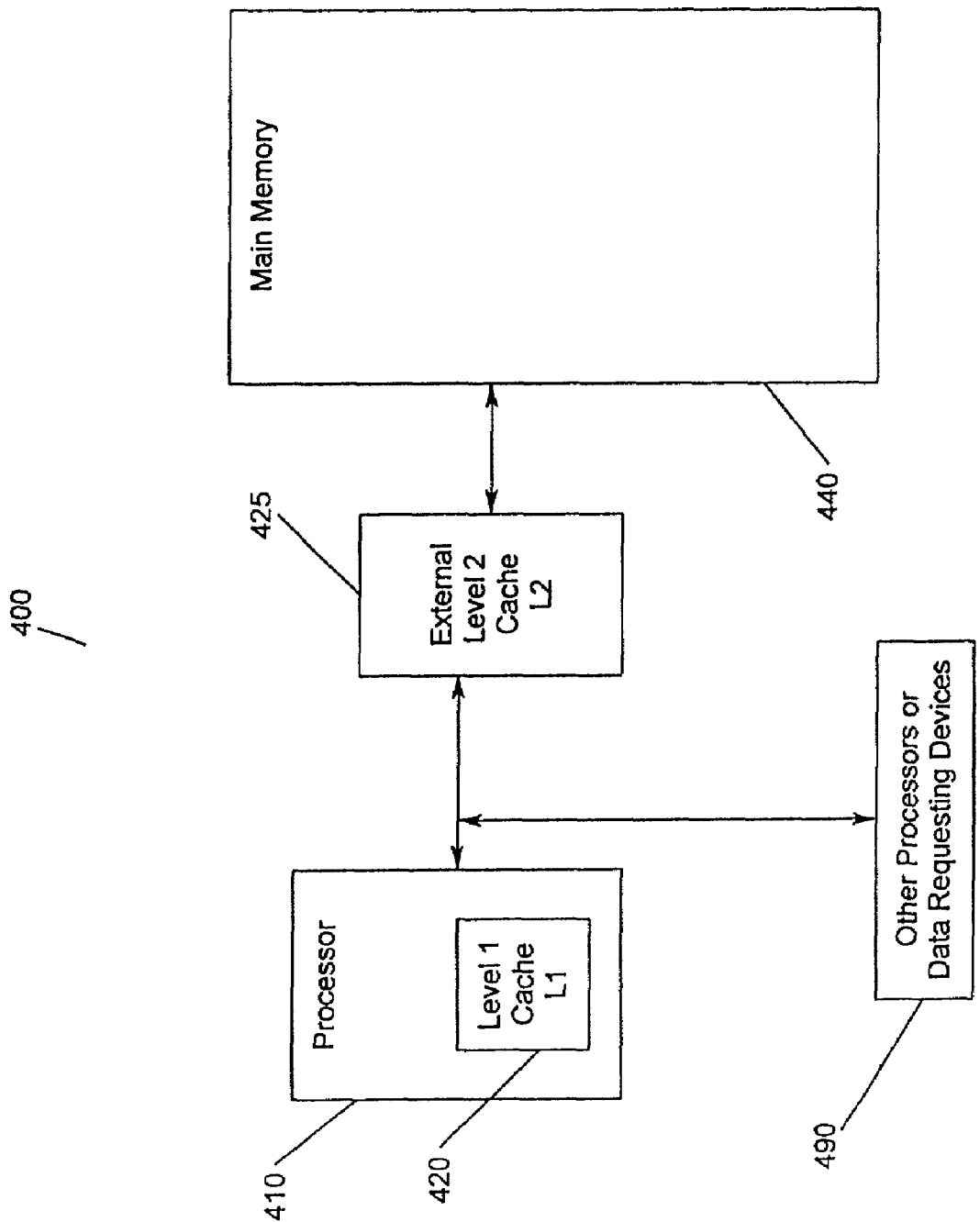
FIG. 4 illustrates a computing system with a processor having an embedded L1 cache memory according to an embodiment of the invention.

FIG. 4 illustrates a computing system 400 embodied by the present invention. In FIG. 4, a data or information request originates at the processor 410. A request to access data begins by inspection of the embedded level one (L1) cache 420. In this system, a level one (L1) cache 420 has been embedded on the processor 410. If the requested data is present or accessible from the L1 cache 420, the data is accessed and available for immediate processing at the processor 410. This is an optimal situation, because the time required to access data from the L1 cache 420 is the shortest possible time.

However, if the data or instruction is not present in the L1 cache 420, the external level two (L2) cache 425 is inspected for the requested data. The L2 cache 425 has a larger data storage capacity than the L1 cache 420. If the data is present in the L2 cache 425, the data is submitted to the processor 410 for processing and the data is also submitted to the L1 cache 420 for storage therein. Storing the retrieved data in the L1 cache 420 provides a more rapid access of the data in future accesses. Accessing the data from the L2 cache 425 is less desirable than accessing the data from the L1 cache 420. In accessing data from the L2 cache 425, time is lost looking for the data in the L1 cache 420, looking for data in the L2 cache 425, sending the data to the L1 cache 420 for storage therein and sending the data to the processor 410 for processing. Accessing data from the L2 cache 425 is, however, more desirable than accessing the data from the main memory 440.

If the data or instruction requested is not present in either of the L1 or L2 caches, 420 or 425, respectively, the data or instruction must be retrieved from main memory 440. Both of these caches run at the same frequency as the processor. Time is lost in accessing the data in the same way as in the access of L2 cache 425. The access time increases as the system progresses down the hierarchy. For example, after looking for the data in both of the L1 and L2 caches, 420 and 425, respectively, the main memory is accessed. Access time to main memory 440 is much longer than that of the caches due to the use of slower, but cheaper memory devices, slower clock speeds, longer distances, etc. The data is stored in both the L2 cache 425 and subsequently the L1 cache 420. The data is submitted to the processor 410 for processing. In the computing system according to an embodiment of the invention, other processors and data requesting devices may be linked 490 to effectively share data and instructions therewith.

Figure 5:
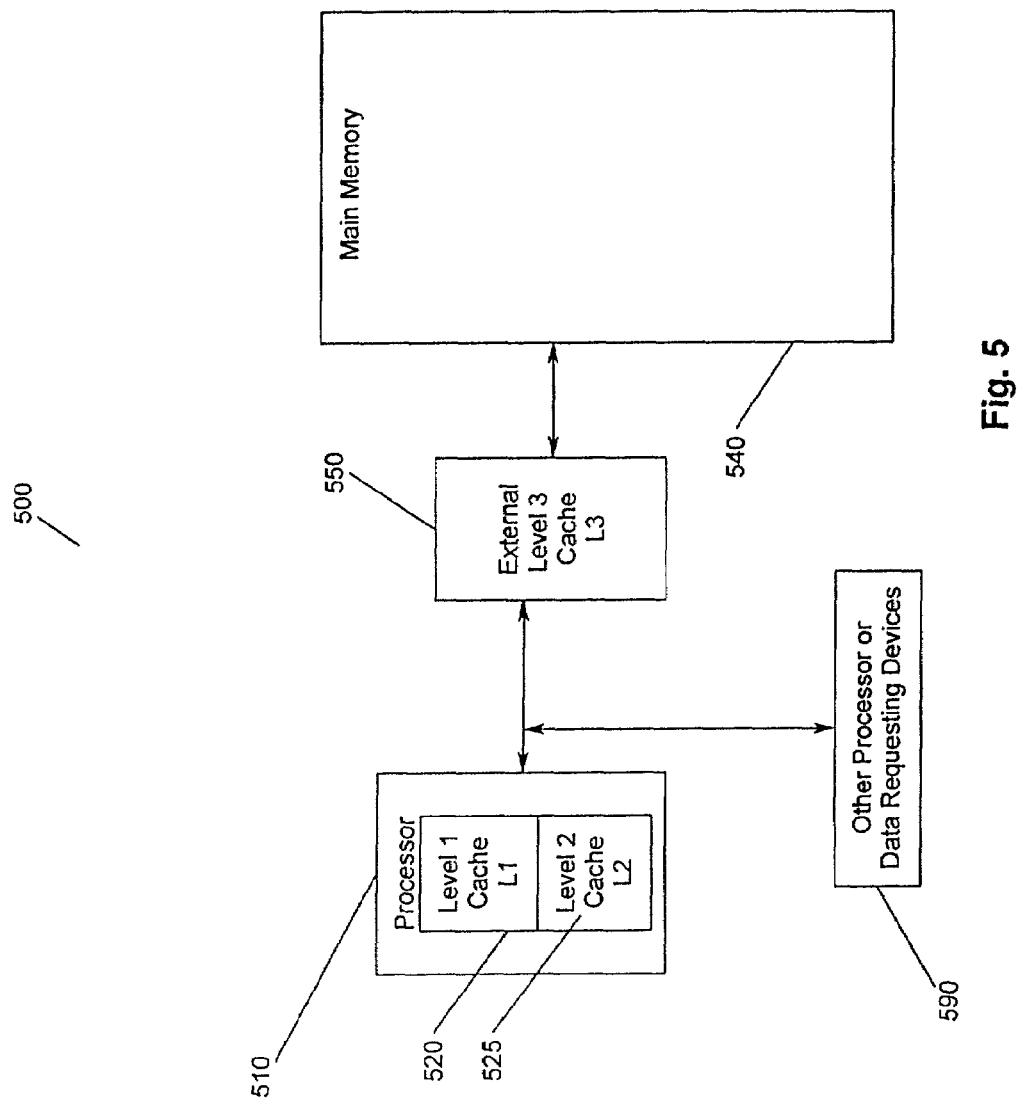
FIG. 5 illustrates another computing system with a processor having both L1 and L2 embedded caches according to an embodiment of the invention.

FIG. 5 illustrates another computing system 500 according to an embodiment of the invention. In FIG. 5, a data or information request originates at the processor 510. A request to access the data begins by inspection of the embedded level one L1 cache 520. If the requested data is present or accessible from the L1 cache 520, the data is accessed and available for processing at the processor 510. This is the more desirable situation, because the time required to access the data is the shortest possible time.

However, if the data or instruction is not present in the embedded L1 cache 520, the embedded level two (L2) cache 525 is inspected for the requested data. The embedded L2 cache 525 has a larger data capacity than the embedded L1 cache 520. If the data is present in the embedded L2 cache 525, the data is submitted to the processor 510 for processing and the data is also submitted to the embedded L1 cache 520 and stored therein.

Storing the retrieved data in the embedded L1 cache 520 provides a more rapid access of the data in the event of future data requests. Accessing the data from the embedded L2 cache 525 is less desirable than accessing the data from the embedded L1 cache 520. In accessing data from the L2 cache 525, time is lost looking for the data in the L1 cache 520, looking for data in the L2 cache 525, sending the data to the L1 cache 520 for storage therein and sending the data to the processor 510 for processing.

If the data or instruction requested is not present in either of the L1 or L2 caches, 520 or 525, respectively, the external level three (L3) cache 550 is inspected to access the data or instruction. Time is lost in accessing data in the same way as in the access of L2 cache 525. The access time increases as the system progresses down the hierarchy. For example, after looking for the data in both of the L1 and L2 caches, 520 and 525, respectively, the L3 cache 550 is searched. Target data is stored in both the L2 cache 525 and then the L1 cache 520. The data is submitted to the processor 510 for processing. Accessing data from the L3 cache 550 is still more desirable than accessing the data from the main memory 540.

If the data or instruction requested is not present in either of the L1, L2 or L3 caches, 520, 525 or 550, respectively, then the main memory 540 is inspected to access the data or instruction. Time is lost in accessing the data in the same way as in the access of L3 cache 550. The access time increases as the system progresses down the hierarchy. For example, after looking for the data in the L1, L2 and L3 caches, 520, 525 and 550, respectively, the main memory 540 is searched. Eventually, the data may be found and submitted to the processor 510 for processing. In a computing system according to an embodiment of the invention, other processors and data requesting devices may be linked 590 to effectively share data and instructions therewith.

Figure 6:
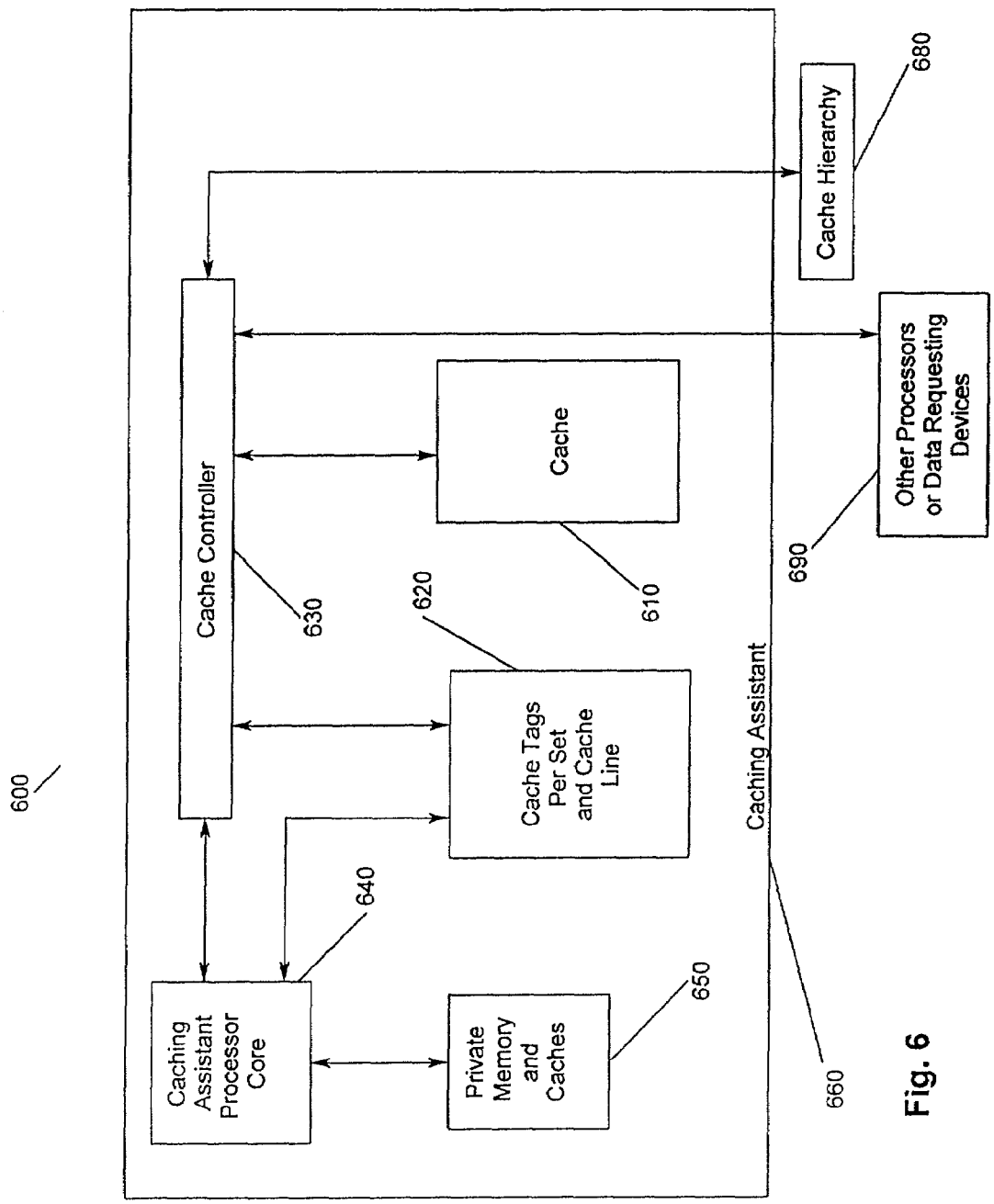
FIG. 6 illustrates a caching assistant and the relationship of the caching assistant to a computing system according to an embodiment of the invention.

FIG. 6 illustrates a structural arrangement of the caching assistant 600 according to an embodiment of the invention. The caching assistant 660 is provided with a cache controller 630 that provides data control between the cache 610, a tag memory 620 containing of cache tags per set and cache tags per cache line and a caching assistant processor core 640. The caching assistant processor core 640 is shown associated with additional private memory and caches 650. It is clear from FIG. 6 that the caching assistant processor 640 is arranged to assist in the rapid retrieval of data to the cache controller 630. The caching assistant's main function is to increase the probability of locating a specific piece of data in that cache. When a data request is made by a data requesting device, the cache controller 630 compares the tag portion of the address being read against the tags stored in each way of the cache set indexed by the address. If there is an exact comparison and the way which compared is valid then the cache controller 630 retrieves the data referenced by that way from the main cache 610 of the caching assistant 660. The cache assistant processor core 640 can also prefetch data which is likely to be requested from the main cache 610 to increase the speed of processing and increase the hit ratio. The caching assistant processor core 640 is monitoring activity and can decide to take many other actions which can optimize the hit ratio. In the computing system according to an embodiment of the invention, the cache controller is associated with other processors and data requesting devices 690 may be linked to the cache controller to effectively share data and instructions therewith.

In addition to normal cache tags like Valid (V) and Dirty (D), and other frequently used cache tags, and especially those tags required for multiprocessor computing systems, the caching assistant processor core 640 introduces the concept of the Fixed (F) flag. This flag indicates that the cache line is not to be invalidated or cast out. The valid (V) cache tag indicates that the cache line is available for being written to. The dirty (D) cache tag indicates that the data stored in that cache is available for update to the memory system. The caching assistant processor core 640 can turn off the Valid (V) flag for a particular cache line indicating that the cache line is available for storing new data or being overwritten. Other flags could be conceived which could be controlled or set by the caching assistant processor core 640 and subsequently used by the cache controller 630.

Through monitoring of the cache hierarchy 680, the caching assistant 660 can determine that a particular cache line needs to be fixed in a particular cache level of the cache hierarchy 680. This involves turning on the Fixed (F) flag. When the caching assistant processor core 640 sets the F flag on, then the cache controller 630 will not invalidate that cache line. The cache line can be cleaned, in that the updated data can be written out to main memory, but that cache line will never be chosen to be cast out and replaced by another cache line. The caching assistant processor core 640 can also reset the F flag to indicate that it can now be invalidated if necessary. Once invalidated, the cache line remains that way until the Fixed (F) flag is turned off or set to the condition of not being fixed. The caching assistant 660 can always turn the Fixed (F) flag off when it is determined to be preferable to do so.

Each cache set may be provided with a Lock (L) bit, which may be tested by either the caching controller 630 or the caching assistant processor core 640, before changing the flags. A data request may secure the Lock (L) bit before reading or writing the tags, that is, if the particular cache set or cache line is locked, the data may be accessed, but may not be altered, until the (L) flag is reset.

The caching controller 640 normally schedules cached information for update to the memory system by setting the Dirty (D) flag on. Dirty data, that is, data that has already been processed or modified, has to be snooped when other processors or data requesting devices 690 attempt to access that cache line. The snoop event will cause additional latency because the cache controller 630 will have to hold the requester off until it can flush the dirty cache line to the main memory and all caches below this in the hierarchy. Performance is improved by having the caching assistant processor core 640 clean the dirty cache lines during idle periods. Cleaning a cache line means writing the update to the main memory and caches below this one in the hierarchy while leaving the cache line in the cache. The dirty bit is then turned off.

Figure 7:
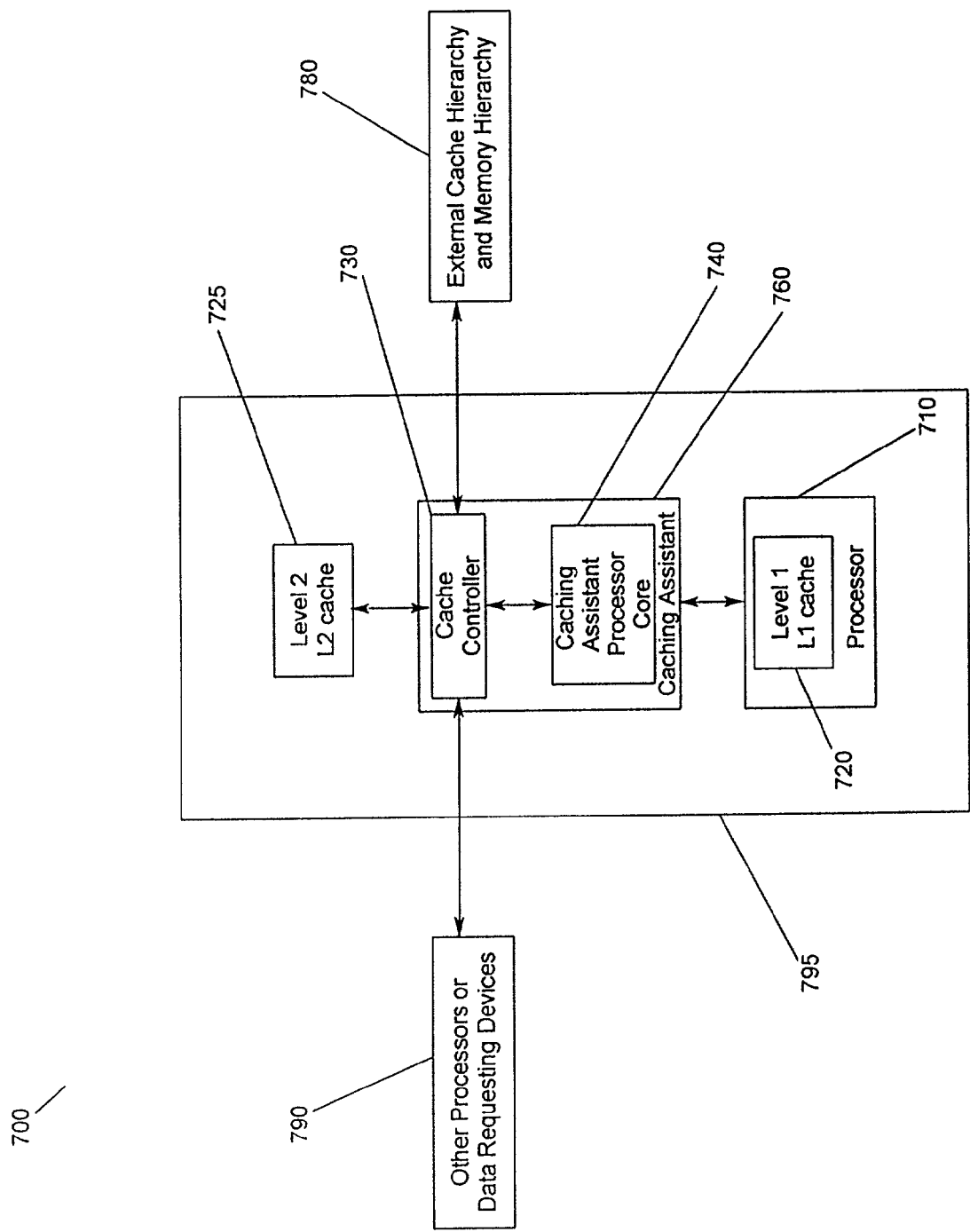
FIG. 7 illustrates a processor having a caching assistant, embedded L1 and L2 caches, and a relationship of the caching assistant to a computing system according to an embodiment of the invention.

FIG. 7 is a structural arrangement 700 of a processor having a caching assistant according to an embodiment of the invention. In FIG. 7, a processing system 795 is disclosed. The processing system 795 has resident thereon, a processor 710. The processing system 795 may be an integrated circuit. The processor 710 is associated with a caching assistant 760. The caching assistant 760 controls and monitors data requests from the processor 710. The caching assistant 760 is provided with a cache controller 730 and a caching assistant processor core 740.

The processing system also has embedded thereon a level one L1 cache 720 and a level two L2 cache 725. The processing system 795 may be an integrated circuit. Advantageously, because the processor 710, the caching assistant 760 and the embedded L1 and L2 caches (720 and 725, respectively) are all embedded in the processing system 795, the caching assistant 760, the L1 cache 720 and the L2 cache 725 are able to operate at the same frequency as the processor 710, that is, at the operating frequency of processor 710. Having the caching controller 730 operating at the frequency of the processor 710 vastly improves data request response time and instruction request response time.

The cache controller 730 monitors and controls data requests from the processor 710, other processors and data requesting devices 790. The caching assistant 760 searches the embedded L2 cache 725, respectively, and if the requested data is not found therein, request the data from the external cache hierarchy 780. Because the caching assistant 760 is in communication with other processors and data requesting devices 790, the caching assistant 760 is able to access data stored in cache and memory hierarchies associated with the other processors and data requesting devices 790 in the computing system.

Referring to FIG. 7, the caching assistant processing core 740 may also be programmed to understand the memory map of the computing system. The caching assistant processing core 740 may also be programmed with advanced code access information. For example, the caching assistant processing core 740 could be programmed with and programmed to know the program code, the instructions to be fetched from memory, and the addresses of the data and instruction to be fetched. The caching assistant processing core 740 can then prefetch as necessary to improve performance. It can also clean dirty lines as time permits. It can also invalidate or flush lines that it determines will not be accessed in the near future.

Because the caching assistant 760 is programmable, it can be programmed to know all of the characteristics of the cache levels in the cache hierarchy 780. Therefore, by keeping track of which addresses and cache lines are being requested, fetched, cast out, overwritten and submitted to main memory, the caching assistant processing core 740 is able to determine what addresses and cache lines are in which caches in the cache hierarchy 780. Knowing this can prevent this cache from simply having a replicate copy of the cache above it.

The caching assistant 760 has access to the type of operation being performed, e.g., read, write, flush, etc. The caching assistant processing core 740 also has access to the cache hierarchy's 780 responses to particular processor 710 data requests. In other words, the caching assistant processing core 740 is aware of whether a data request was a write, read or other function, and whether the data request resulted in a hit or a miss. The caching assistant 760 is also aware of whether the data request resulted in an invalidate, cast out or replacement of data from any of the caches in the cache hierarchy 780. The caching assistant 760 can keep track of historical information thereby determining trends and making decisions based on those trends.

The caching assistant 760 can anticipate or predict what addresses and cache lines are likely to be fetched in the future. Provided with this knowledge the caching assistant can make advanced decisions on what information to prefetch and which to cast out.

Figure 8:
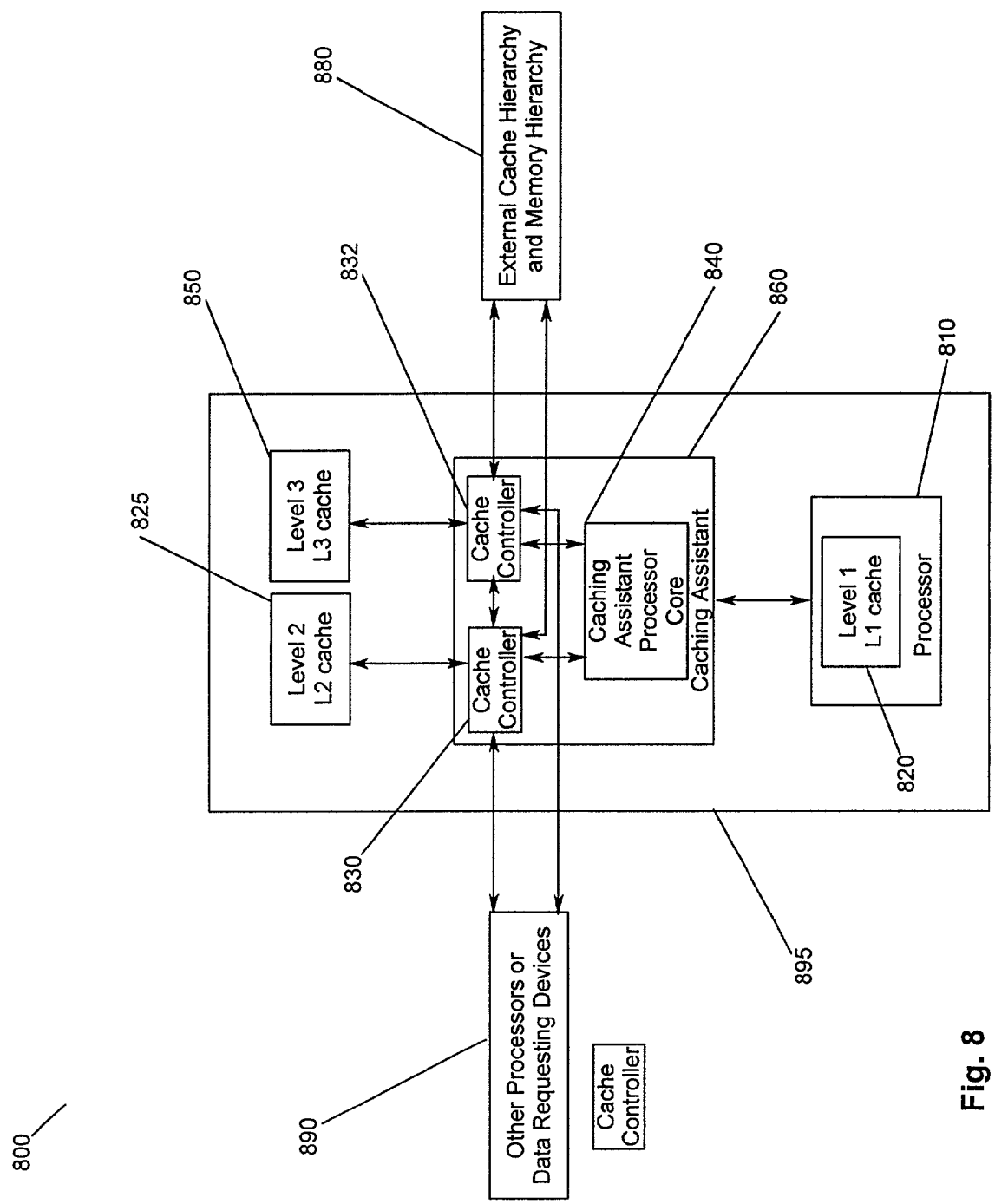
FIG. 8 illustrates a processor having a caching assistant, embedded L1, L2 and L3 caches, and a relationship of the caching assistant to a computing system according to an embodiment of the invention.

FIG. 8 is a structural arrangement 800 of a processor having a caching assistant according to an embodiment of the invention. In FIG. 8, a processing system 895 is disclosed. The processing system 895 has resident thereon, a processor 810. The processing system 895 may be an integrated circuit. The processor 810 is associated with a caching assistant 860. The caching assistant 860 controls and monitors data requests from the processor 810. The caching assistant 860 is provided with a cache controller 830 to control the L2 cache 825 and a cache controller 832 to control the L3 cache 850.

The processing system also has embedded thereon a level one L1 cache 820, a level two L2 cache 825 and a level three L3 cache 850. The processing system 895 may be an integrated circuit. Advantageously, because the processor 810, the caching assistant 860 and the embedded L1, L2 and L3 caches (820, 825 and 850, respectively) are all embedded in the processing system 895, the caching assistant 860, the L1 cache 820, the L2 cache 825 and the L3 cache 850 are able to operate at the same frequency as the processor 810, that is, at processor 810 frequency. Having the caching assistant 860 operating at the operating frequency of processor 810 vastly improves data request response time and instruction request response time.

The cache controllers 830, 832 monitor and control data requests from the processor 810, other processors and data requesting devices 890. The caching assistant 860 searches the embedded L1, L2 and L3 caches, 820, 825 and 850, respectively, and if the requested data is not found therein, searches the external cache hierarchy and memory hierarchy 880. Because the caching assistant 860 is in communication with other processors and data requesting devices 890, the caching assistant 860 is able to access data stored in cache and memory hierarchies associated with the other processors and data requesting devices 890 in the computing system. Although not shown in FIG. 8, a separate assistant processing core 840 could be implemented for each cache controller 830, 832 respectively. Additionally, the L3 cache 850 can be located externally to the integrated circuit, but still controlled by the cache controller 832. In this arrangement, the L3 cache 850 would usually run slower than the processor speed.

Figure 9:
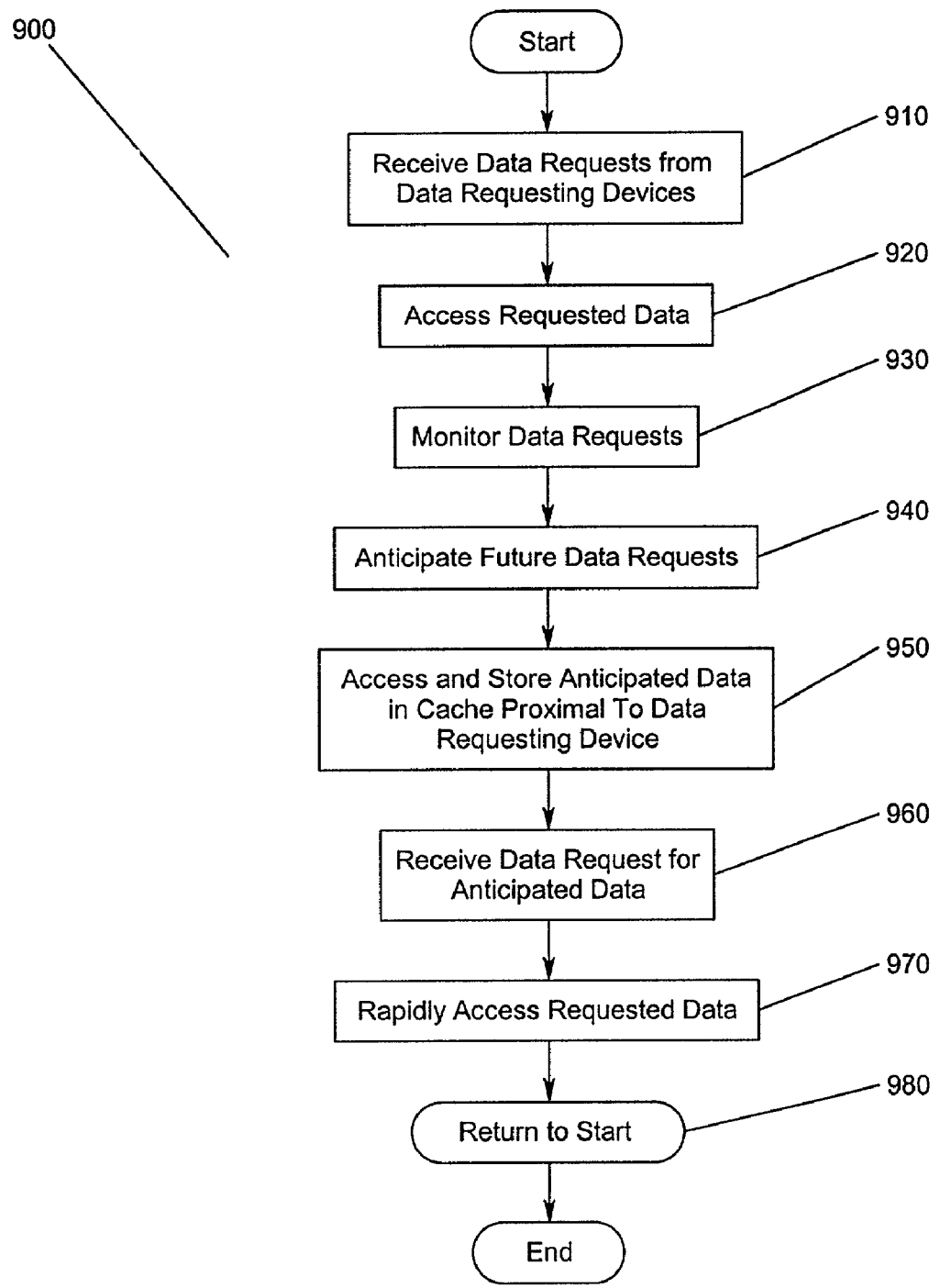
FIG. 9 is a flowchart illustrating a method for increasing the processor performance in a computing system according to an embodiment of the invention.

FIG. 9 is a flowchart 900 illustrating a method for increasing the processor performance in a computing system according to an embodiment of the invention. In FIG. 9, a data request is received from a data requesting device 910. Access of the requested data 920 is initiated with an inspection of the cache hierarchy to locate where the data is stored or the data is to be written. Inspection of the cache hierarchy includes inspection of the cache hierarchy's cache tags and flags to locate the requested data.

The cache controller monitors the data requests 930 throughout the entire cache hierarchy. The caching assistant monitors and coordinates 930 data requests from the processor, processors and other data requesting devices in the computer system. The caching assistant has access to the cache hierarchy's cache tags and flags. The cache tags are stored in a dual read/write port (RAM), such that the caching assistant can read and alter the tags.

Through monitoring and controlling accesses 930 taking place throughout the cache hierarchy, the caching assistant is able to recognize patterns of accesses occurring during processing. The pattern recognition allows the caching assistant to anticipate future data requests 940 and optimize the hit ratio of at least one non-L1 cache.

The caching assistant may be programmed to look for certain patterns in the data accesses, and upon recognition of a pattern, tune the contents of the caches in the cache hierarchy, by fetching and locking in, accessing and storing 950, anticipated cache lines and cache addresses, to cache proximal to the data requesting device, to rapidly respond to predicted data requests (960 and 970, respectively), and thus maximize hit ratios in at least one non-L1 cache in the cache hierarchy. The caching assistant receives additional requests 980 from the processor, processors or other data requesting devices.

Figure 10:
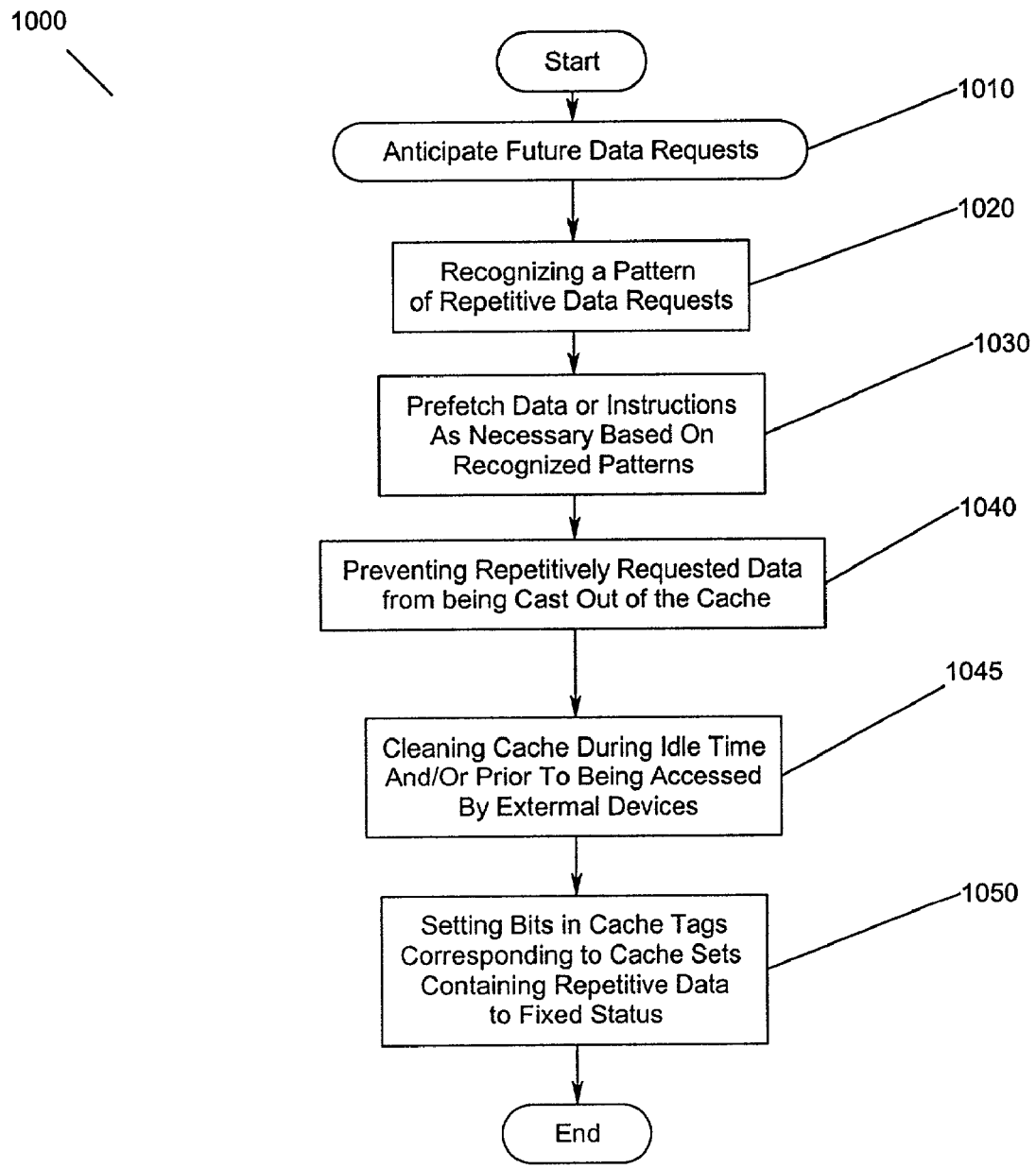
FIG. 10 is a flowchart illustrating a method for anticipating future data requests through pattern recognition according to an embodiment of the invention.

FIG. 10 is a flowchart 1000 illustrating a method of anticipating future data requests through pattern recognition (i.e, data characteristics) according to an embodiment of the invention. In addition to anticipating future data requests 1010, the caching assistant also looks for other patterns of data accession 1020 occurring in at least one non-L1 cache in the cache hierarchy.

Another pattern recognized is whether the data is repetitively being accessed 1020. Cache lines that are repetitively requested are placed in high levels of the cache hierarchy avoiding latency in responding to data requests from the processor, processors or other data accessing devices. Repetitively accessed data are stored at the highest possible cache level available 1030 to optimize the hit ratio of at least one non-L1 cache.

Repetitively requested data is prevented from being cast out of the cache 1040. The cache is cleaned during idle time (and/or prior to being accessed by external devices) 1045. To lock or fix the data the lock bit is set or the fixed flag is activated. The event is time stamped by a timer. Bits which correspond to the cache tags and cache sets containing recognized repetitively accessed data are set to fixed status to prevent the cache lines being invalidated and cast out of the cache 1050.

Figure 11:
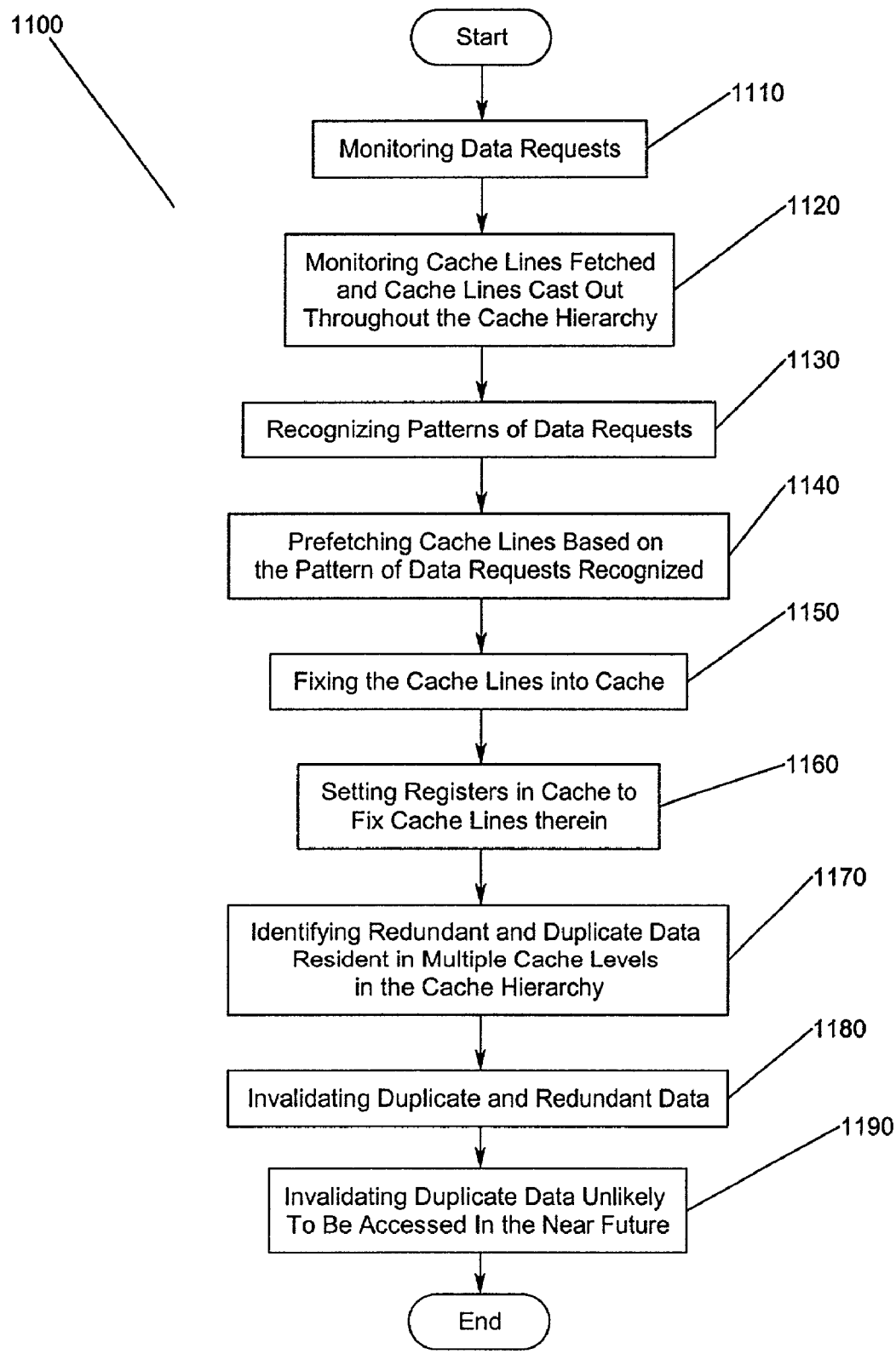
FIG. 11 is a flowchart illustrating a method for monitoring data requests according to an embodiment of the present invention.

FIG. 11 is a flowchart 1100 illustrating a method of monitoring data requests according to an embodiment of the present invention. In FIG. 11, data accesses are monitored 1110 throughout the cache hierarchy. Cache lines being fetched and cache lines being cast out of particular caches throughout the cache hierarchy 1120 are monitored.

While monitoring, patterns of data requests are recognized 1130. Cache lines predicted to have higher probability of being accessed are prefetched into cache levels 1140 of the cache hierarchy. The probability is determined based on the recognized patterns 1130. Monitoring the data accesses 1110 and 1120 allows anticipation of which cache lines are likely to be requested soon. Data associated with the anticipated requests is stored in the cache levels.

Prefetched cache lines are fixed 1150 into cache levels to prevent the cache lines being cast out before being accessed 1150. Setting tags in the cache levels fixes the cache lines (1150 and 1160) therein. Locking may be set by the assistant.

Data having a predetermined characteristic, e.g., identified redundant 1180 and duplicate data 1170, may be invalidated. Cache lines that are known to be already resident in higher level caches may be cast out or invalidated. Prefetched data replaces the invalidated and cast out data and cache lines 1190 to optimize the hit ratio of at least one non-L1 cache.

Figure 12:
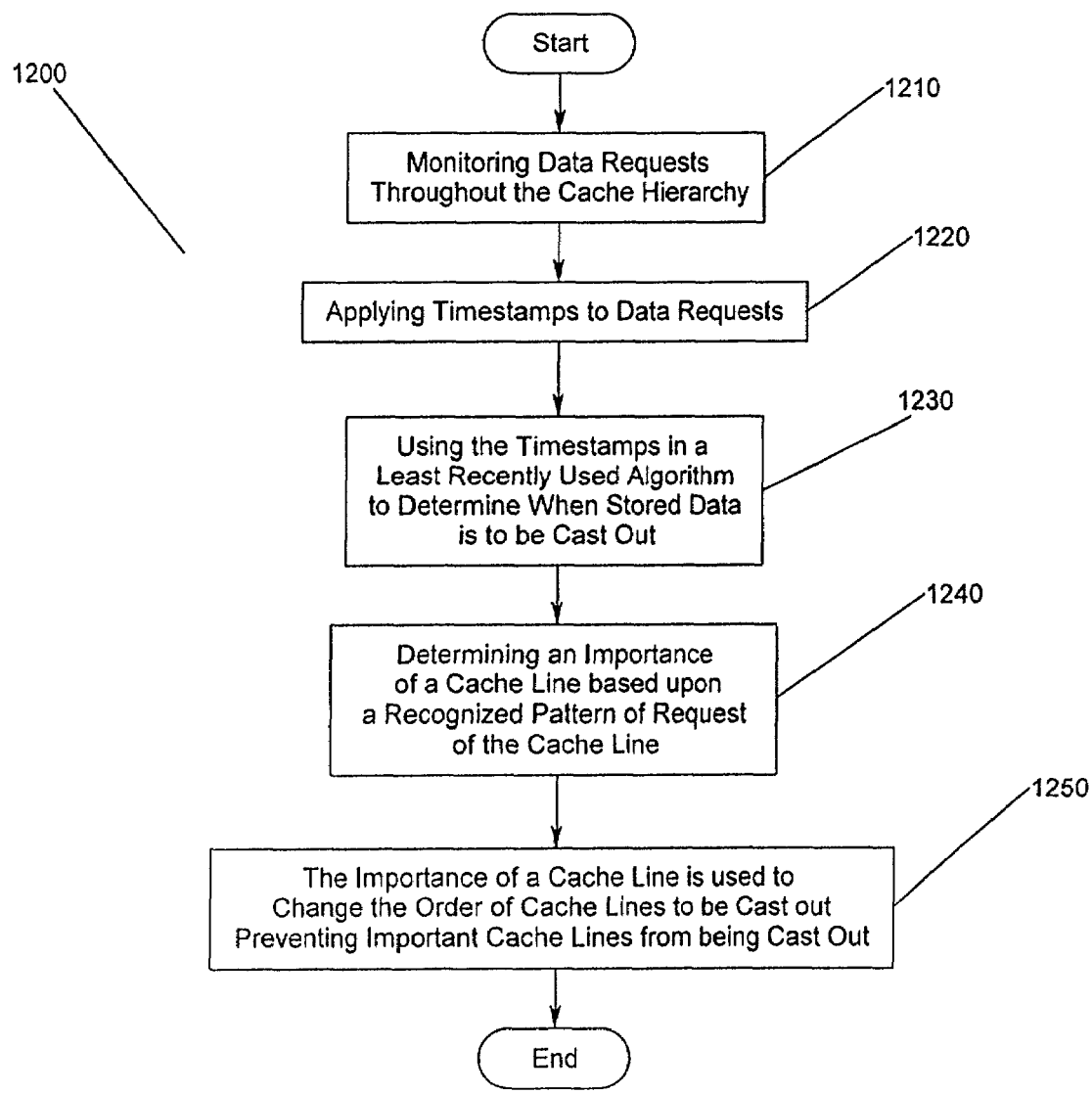
FIG. 12 is a flowchart illustrating another method for monitoring data requests according to an embodiment of the present invention.

FIG. 12 is a flowchart 1200 illustrating another method of monitoring data requests according to an embodiment of the present invention. In FIG. 12, data requests are monitored 1210 throughout the computing system. Precise times of data accesses are known through use of timers and the application of timestamps to data requests 1220, the time stamps being recorded. The timers being used to apply timestamps to accesses, hits, misses and address requests.

The least recently used (LRU) flags and the time stamps in the least recently used algorithm are used to determine when stored data is to be cast out of a particular cache level 1230. Least recently used flags are stored in a dual read/write port (RAM) and may be altered.

The importance of a cache line can be determined by recognizing patterns of data cache line requests 1240. The importance of a cache line may be determined by the number of times the cache line is being requested or if the data is part of a critical path in a the program or for other reasons 1240. The caching assistant can also be programmed to know the relative importance of certain instructions or data elements. Relative importance can be used by the prefetching caching assistant processor core to determine prefetching or it can be used when deciding which way to cast out to make room for an access which missed the cache. A new flag, Important (I), can be set by the caching assistant processor core which the cache controller uses along with other information, e.g., LRU, to determine which line to cast out or invalidate. The (I) flag becomes a softer version of (F), whereas (I) precludes casting out when there are no other unimportant data to cast out.

Setting registers controls the cache lines and cache addresses being cached in certain ranges and fixes certain ranges that are executed frequently. Setting the registers and fixing the cache lines deemed important may have a major impact on overall system performance 1240 and optimize the hit ratio of at least one non-L1 cache. For example, interrupt handlers, portions of the operating system kernel, or other program specific repetitive functions, could be fixed into a particular cache or set as important to optimize the hit ratio of at least one non-L1 cache.

The least recently used (LRU) order of cache lines may be changed upon determination that certain addresses are more important to keep than others. Changing the order 1250 set forth in the Least recently used algorithm prevents important cache lines from being cast out. The important cache lines may be locked or fixed to prevent the cache lines from being cast out or invalidated 1250, or important flag set. For FIGS. 9–12, the caching assistant processor core and the cache controller may operate independently.

Figure 13:
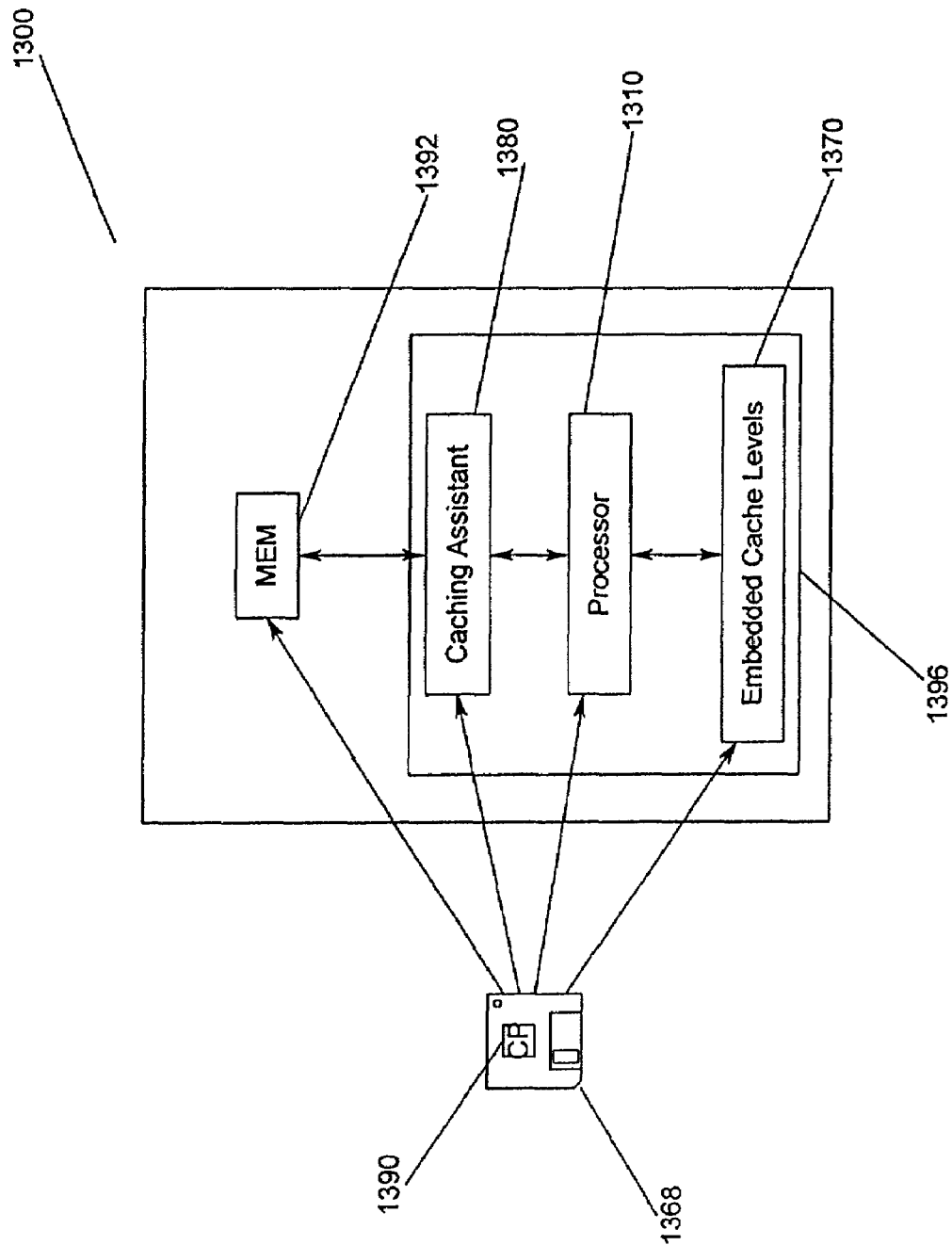
FIG. 13 illustrates a computer-readable medium or carrier having a computer program comprising instructions which, when read and executed by the controller causes the controller system to perform the steps necessary to execute the steps or elements of the present invention.

FIG. 13 illustrates a controller system 1300 according to the present invention. In FIG. 13, the processes illustrated with reference to FIGS. 9–12, may be tangibly embodied in a computer-readable medium or carrier, e.g. one or more of the fixed and/or removable data storage devices 1368 illustrated in FIG. 13, or other data storage or data communications devices. A computer program 1390 expressing the processes embodied on the removable data storage devices 1368 may be loaded into the memory 1392, a processor system 1396, a processor 1310, a caching assistant, or embedded cache levels 1370 to configure the controller system 1300 of FIG. 13, for execution. The removable data storage devices 1368 may be any type of removable storage, including, but not limited to, flash memory. The computer program 1390 comprises instructions which, when read and executed by the controller system 1300 of FIG. 13, causes the controller system 1300 to perform the steps necessary to execute the steps or elements of the present invention and optimize the hit ratio of at least one non-L1 cache.

A method and apparatus for improving performance of a computing system has been disclosed herein. Computing system performance is improved by analyzing system activity and optimizing the hit ratio of at least one non-L1 cache. A computing system and a processing system having a caching assistant provided to optimize a hit ratio of at least one non-L1 cache have also been described.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for increasing performance of a computing system, the method comprising:
   monitoring non-Level 1 caches in a cache hierarchy;
   identifying data access requests from a processor;
   determining when data accesses match a pattern indicating that data is being repetitively accessed; and
   optimizing a hit ratio in the non-Level 1 caches in a cache hierarchy by preventing data stored in the non-L1 cache from being cast out based upon a data access matching the pattern indicating that data is being repetitively accessed.

2. The method of claim 1, wherein the optimizing the hit ratio further comprises prefetching data predicted to be requested based upon identification of the pattern.

3. The method of claim 2, wherein the optimizing the hit ratio further comprises setting flags for cache lines in the non-Level 1 caches in the cache hierarchy to identify data to invalidate, cast out and replace.

4. The method of claim 3, wherein the optimizing the hit ratio further comprises maintaining historical information regarding data access to identify data access trends.

5. The method of claim 4, wherein the optimizing the hit ratio further comprises identifying addresses and cache lines that are likely to be fetched based upon the historical information.

6. The method of claim 1, wherein the optimizing the hit ratio further comprises setting flags for cache lines in the non-Level 1 caches in the cache hierarchy to identify data to invalidate, cast out and replace.

7. The method of claim 1, wherein the optimizing the hit ratio further comprises maintaining historical information regarding data access to identify data access trends.

8. The method of claim 1, wherein the optimizing the hit ratio further comprises identifying addresses and cache lines that are likely to be fetched based upon historical information.

9. The method of claim 1, wherein the optimizing the hit ratio further comprises cleaning dirty cache lines during idle time and/or prior to being accessed by external devices based upon the pattern.

10. The method of claim 1, wherein the optimizing the hit ratio further comprises determining cache lines to fix into a non-L1 cache based upon the pattern.

11. A computing system, comprising:
    at least one processor;
    a cache hierarchy containing at least one non-L1 cache; and
    a caching assistant, the caching assistant comprising:
      a separate processor core, the separate processor core monitors non-Level 1 caches in a cache hierarchy, identifies data access requests from a processor and determines when a data accesses match a pattern indicating that data is being repetitively accessed; and
      a memory,
    wherein the caching assistant increases performance of the at least one processor by optimizing a hit ratio in the non-Level 1 caches in a cache hierarchy by preventing data stored in the non-L1 cache from being cast out based upon a data access matching the pattern indicating that data is being repetitively accessed.

12. The computing system of claim 11, wherein the caching assistant optimizes the hit ratio by prefetching data predicted to be requested based upon identification of the pattern.

13. The computing system of claim 12, wherein the caching assistant further optimizes the hit ratio by setting flags for cache lines in the non-Level 1 caches in the cache hierarchy to identify data to invalidate, cast out and replace.

14. The computing system of claim 13, wherein the caching assistant further optimizes the hit ratio by maintaining historical information regarding data access to identify data access trends.

15. The computing system of claim 14, wherein the caching assistant further optimizes the hit ratio by identifying addresses and cache lines that are likely to be fetched based upon the historical information.

16. The computing system of claim 11, wherein the caching assistant optimizes the hit ratio by setting flags for cache lines in the non-Level 1 caches in the cache hierarchy to identify data to invalidate, cast out and replace.

17. The computing system of claim 11, wherein the caching assistant optimizes the hit ratio by maintaining historical information regarding data access to identify data access trends.

18. The computing system of claim 11, wherein the caching assistant optimizes the hit ratio by identifying addresses and cache lines that are likely to be fetched based upon historical information.

19. The computing system of claim 11, wherein the caching assistant optimizes the hit ratio by cleaning dirty cache lines during idle time and/or prior to being accessed by external devices based upon the pattern.

20. The computing system of claim 11, wherein the caching assistant optimizes the hit ratio by determining cache lines to fix into a non-L1 cache based upon the pattern.

21. A processing system comprising:
 means for processing data;
 means for storing data, the means for storing data further comprising a cache hierarchy containing at least one non-L1 cache; and
 means for monitoring non-Level 1 caches in a cache hierarchy;
 means for identifying data access requests from a processor;
 means for determining when a data accesses match a pattern indicating that data is being repetitively accessed; and
 means for optimizing a hit ratio in the non-Level 1 caches in a cache hierarchy by preventing data stored in the non-L1 cache from being cast out based upon a data access matching the pattern indicating that data is being repetitively accessed.

22. An article of manufacture comprising:
 a program storage medium readable by a computer, the medium tangibly embodying one or more programs of instructions executable by the computer to perform operations for increasing processor performance in a computing system, the operations comprising:
 monitoring non-Level 1 caches in a cache hierarchy;
 identifying data access requests from a processor;
 determining when data accesses match a pattern indicating that data is being repetitively accessed; and
 optimizing a hit ratio in the non-Level 1 caches in a cache hierarchy by preventing data stored in the non-L1 cache from being cast out based upon a data access matching the pattern indicating that data is being repetitively accessed.

\* \* \* \* \*